United States Patent [19]

Ling et al.

[11] 4,134,677
[45] Jan. 16, 1979

[54] CLOUD ALTITUDE MEASURING APPARATUS

[75] Inventors: Bernt Ling; Anders Persson; Sven-Erik Söderström, all of Vasteras, Sweden

[73] Assignee: ASEA Aktiebolag, Vasteras, Sweden

[21] Appl. No.: 831,539

[22] Filed: Sep. 8, 1977

[30] Foreign Application Priority Data

Sep. 9, 1976 [SE] Sweden .................................. 7609943

[51] Int. Cl.$^2$ .............................................. G01C 3/08
[52] U.S. Cl. ..................................... 356/5; 343/17.1 R
[58] Field of Search ............................ 356/5; 343/17.1

[56] References Cited

U.S. PATENT DOCUMENTS

| | | | |
|---|---|---|---|
| 3,623,095 | 11/1971 | Gerardin | 343/7.7 |
| 3,650,628 | 3/1972 | Tawfik et al. | 356/4 |
| 3,741,655 | 6/1973 | Ling et al. | 356/5 |

Primary Examiner—S. C. Buczinski

Attorney, Agent, or Firm—Watson, Cole, Grindle & Watson

[57] ABSTRACT

A cloud altitude measuring means for detecting the existence of and the distance to a cloud comprising a light emitting means, a light receiving means, a plurality of integrators activated at separate time intervals to receive the output signal from the light receiving means, a signal summation device to receive and determine the difference between the signals in the said integrators, and a signal processing circuit to receive the output signal from the signal summation device, which circuit comprises a memory circuit to store a first series of measurement value pulses from said summation device and a comparison device for comparing the first series of measurement value pulses stored in the memory with a second time delayed series of measurement value pulses to detect a cloud echo when the comparative difference between the measurement value pulses exceeds a specified value.

5 Claims, 3 Drawing Figures

CLOUD ALTITUDE MEASURING APPARATUS

BACKGROUND OF THE INVENTION

The invention is related to a cloud altitude measuring means for detecting clouds and measuring their altitude by evaluating the light reflected from the said clouds in response to emitted light pulses and is more particularly concerned with means to provide a better signal-noise relationship to increase the accuracy of the measurements.

PRIOR ART

U.S. patent application Ser. No. 771,261 filed Feb. 23, 1977 and U.S. Pat. No. 3,741,655 describe devices for measuring cloud altitude. These known devices include measuring equipment of an optical radar type, whereby an emitter emits short light pulses directed towards the object. In the cited prior art the object is a cloud and when the light pulses hit the cloud, a portion is reflected and part of the reflected light is intercepted by a receiver located adjacent to the emitter. The time required for the light to travel the distance between the emitter and cloud and the cloud and receiver is measured and the altitude of the cloud is determined from the known velocity of light. The known devices further comprise two integrating devices in the receiver unit, which are alternately caused to receive signals intercepted by the receiver. One of the integrating devices is designed to receive noise signals as well as echo signals expected to be emitted from clouds, and the other integrating device is designed to receive noise signals only and to act as a reference. After a number of light pulses have been emitted and echo signals have been received, the contents of the integrating devices are compared. The result of the comparison is placed in proportion to a predetermined signal level, and if this level is exceeded the existence of clouds is indicated.

The receiver scans for the existence of clouds at intervals, for example in steps of an extension of 5 meters within the measuring range. In this manner one or more cloud layers lying one above the other may be continuously registered up to the height at which the reflected light no longer returns to the receiver. To achieve this stepwise measurement, the receiving intervals for the two integrating devices are moved in parallel in time so that the whole measuring range is scanned.

SUMMARY OF THE INVENTION

Accordingly, it is an object of the present invention to provide a better signal-noise relationship for the signals received from a plurality of integrators, which signals are derived from cloud echoes.

Briefly, the invention in its broadest aspect comprises the use of a memory device to store measurement value pulses when a first integrator receives cloud echo signals and a comparison device for comparing measurement value pulses which are received when a second integrator receives cloud echo signals with the stored measurement value pulses coming from the memory. The first integrator pulses are delayed such that the measurement value pulses compared have substantially the same position in the two series of measurement value pulses emitted by a summation device. This measuring method allows an improved analysis of the relationship between echo signal and noise by the comparison device and a more accurate indication of the existence of and the distance to a cloud.

Further objects, advantages, and features of the invention will be apparent in the arrangement and construction of the constituent elements in detail as set forth in the following specification taken together with the accompanying drawing.

DETAILED DESCRIPTION OF THE PREFERRED EMBODIMENT

Figure 1:
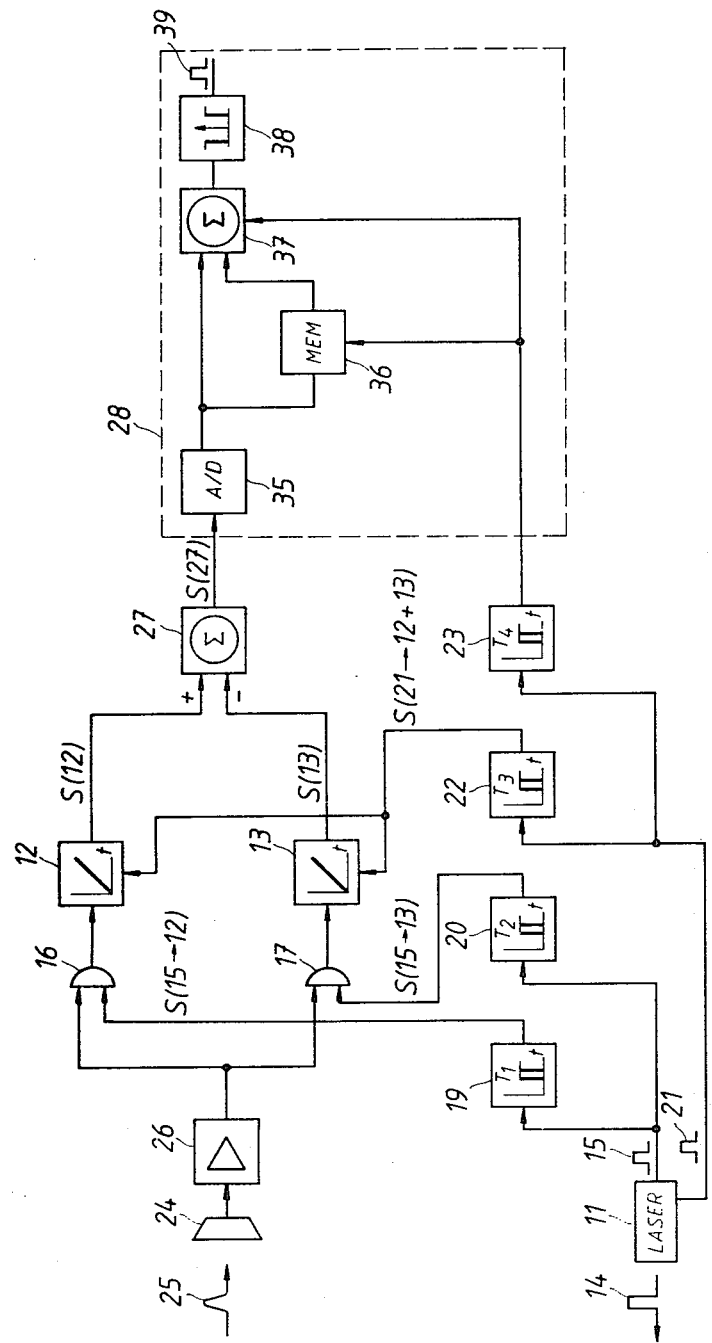
FIG. 1 is a block schematic diagram of the invention.
Figure 2:
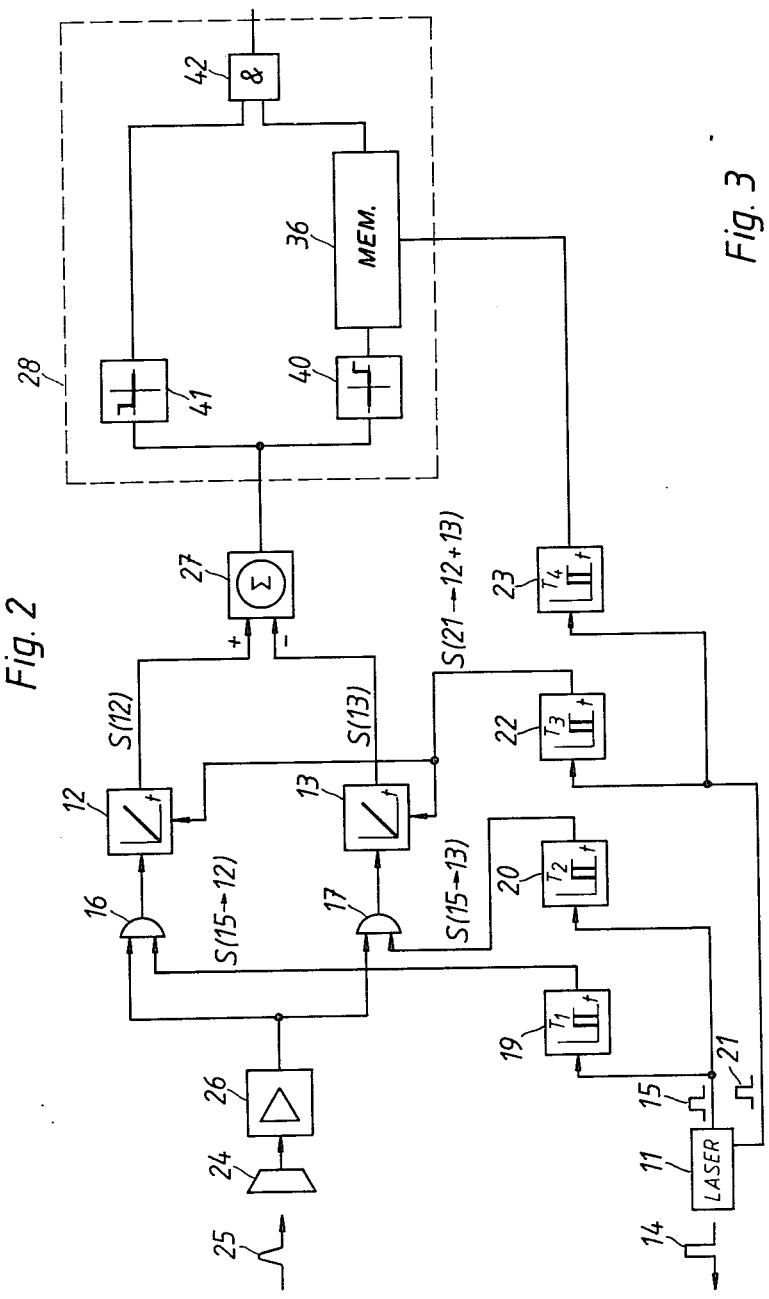
FIG. 2 is a block schematic diagram of the invention depicting another embodiment of the signal processing circuit.

FIGS. 1 and 2 show a light emitter 11, preferably a GaAs laser diode with the necessary drivers for emitting a series of light pulses 14. A light receiver, consisting of a light detector 24, which preferably consists of an avalanche photo-diode, and a signal amplifier 26, is arranged to receive signals 25 representing reflections of the emitted light pulses 14 from a cloud and noise, the noise being caused by amplifier noise and sunlight diffusely reflected from the cloud. The signals 25 detected by the detector 24 are amplified in a signal amplifier 26 and are then supplied to two integrators 12 and 13 by way of AND gates 16 and 17. Upon the emission of each light pulse 14 in a series of light pulses, emitter 11 transmits a control pulse 15 to gates 16 and 17, respectively, through time delay circuits 19 and 20, respectively. Time delay circuit 19 delays pulse 15 for a time $T_1$ and time delay circuit 20 delays pulse 15 for a time $T_2$. Control pulses 15 thus determine, through the time delay circuits, the time intervals during which the detected signals 25 are supplied to integrators 12 and 13, respectively. For each control pulse 15 an additional signal is received in each of the respective integrators, and the magnitude of this signal depends on the signal level at the time, that is, echo signals in addition to a noise signal. The output voltage of each integrator increases with the number of control pulses 15, which is equal to the number of light pulses in a light pulse series.

After the emitter 11 has delivered the last pulse 14 in a series of light pulses in one and the same receiving interval for integrators 12 and 13, it emits a control pulse 21 to integrators 12 and 13 through a time delay circuit 22, which delays pulse 21 for the time $T_3$. This pulse effects a resetting of the integrators, whereby a new series of light pulses 14 can be emitted towards the target and the corresponding echoes be integrated in the integrators.

Control pulse 21 is also delivered through a time delay circuit 23 with the delay time $T_4$ to memory circuit 36 in signal processing circuit 28. The function of memory circuit 36 shall be later described. The control pulse 21 to the integrators, coming from circuit 22, effects a resetting of these so that a new series of light pulses 14 can be emitted towards the target and the echoes caused by these can be received and integrated in the integrators. Before resetting takes place, the measurement value pulse occurring on the output of a summation device 27 connected to the outputs of the integrators has been forwarded to the signal processing circuit 28.

For the delay times mentioned above, $T_1 > T_2 >$ and $T_3 > T_4$. Therefore, integrator 12, which operates with the longest delay time, receives echoes from a greater distance than integrator 13, that is, it registers clouds at a greater distance than the integrator 13. Due to the stepwise movement of each light pulse series, the two integrators sense the existence of clouds at an increasingly greater distances. The integrator 12 first receives echo signals whereas integrator 13 registers only noise. Since the output of integrator 12 is connected to the positive input of summation device 27 and since echo signal and noise give a greater amplitude than only noise, summation device 27 will emit a positive output signal which is fed into the signal processing circuit. Such signals are shown in FIG. 3 as pointed peaks 29 and are referred to herein as saw-tooth shaped measurement value pulses.

Figure 3:
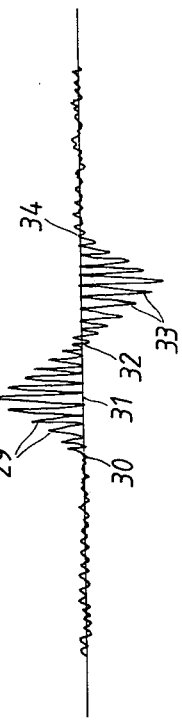
FIG. 3 illustrates two series of saw-toothed shaped measurement value pulses transmitted by the signal summation device.

In FIG. 3 the numeral 30 indicates the time when integrator 12 starts receiving cloud echo signals. Since the edge of the cloud is not absolutely sharp, the first echo will be relatively weak and the corresponding measurement value pulse small. As the forward stepping continues, successively stronger echoes are received up to time 31, thereafter the integrator 12 starts registering echoes from the reflection inside the cloud and successively increasing absorption of the light pulses decreases the strength of the echo signals and thereby the amplitude of the measurement value pulses which amplitude approaches zero at 32. Then the whole light pulse is absorbed by the cloud and integrator 12 registers only noise.

Delay times $T_1$ and $T_2$ increase in time with the forward stepping for each light pulse series, and after some time delay time $T_2$ will equal the value of $T_1$ at point 30 in FIG. 3. Then integrator 13 starts receiving cloud echo signals and since the output of this integrator is connected to the negative input of summation device 27, the summation device starts emitting negative measurement value pulses 33. In the same way as for the positive pulses, the amplitude of the negative pulses starts increasing to a maximum and thereafter decreases to approximately zero at 34 in FIG. 3.

In the present case delay times $T_1$ and $T_2$ have been selected so that the cloud echo signals coming to integrator 12 have been attenuated before integrator 13 starts receiving cloud echo signals. Therefore, the output of summation device 27 will register a number of positive measurement value pulses with amplitudes which start at zero, grow to a maximum and thereafter decrease to zero. Thereafter, the same thing is repeated but with an amplitude of inverted sign. Each measurement value pulse has an amplitude that corresponds to the signal level within the corresponding height interval. The number of saw-tooth pulses is determined mainly by the time between the two times $T_1$ and $T_2$ and by the length of step by which the stepwise movement across the measuring range takes place.

The output signal of summation device 27 is supplied to a signal processing circuit 28. According to FIG. 1, the circuit includes an analogue-digital convertor 35 which converts the analogue measurement value pulses coming from the summation device 27 into digital signals which are fed into a memory 36 with a specific number of memory positions in which they are stored. The digital signals are also fed into a comparison device 37 which is also connected to the output of memory 36. A level sensing device 38 is connected to the output of the comparison device, said device 38 emitting an output signal 39 when the level of the incoming signal exceeds a certain value.

The memory 36 may be designed to operate in various ways, but in accordance with the preferred embodiment, the number of memory positions is determined by the difference between $T_1$ and $T_2$. With reference to FIG. 3 this means that the positive measurement value pulses are supplied to the memory as well as to one inout of comparison device 37. When the measurement process has proceeded so far that point 32 has been reached and negative measurement value pulses start appearing on the output of the summation device, these pulses will be supplied to the comparison device, but at the same time the memory starts emitting positive measurement value pulses to the other input of the comparison device. The comparison device 37 then transmits an output signal representing the sum of the amounts of the negative and positive measurement value pulses. The best degree of efficiency is obtained if the capacity of the memory is selected such that the maximum positive amplitude is respectively compared with the maximum negative amplitude of the measurement value pulses. Both the memory 36 and the comparison device 37 are suitably controlled by the control pulse 21 received from time delay circuit 23.

According to a second embodiment of the signal processing current 28 illustrated in FIG. 2, the signal processing circuit includes two level-sensing devices, one of which, designed 40, receives positive measurement value pulses from summation device 27 and transmits an output signal when the amplitude of the input signal exceeds a specified value. These output signals from level-sensing device 40 are fed into memory 36, the output of memory 36 is connected to one input of an AND gate 42. Negative measurement value pulses are received by the other level-sensing device 41 which delivers an output signal directly to a second input of the AND gate. The memory is set or controlled with control pulses 21 such that when the negative pulses start arriving from the summation device, the memory starts delivering corresponding positive pulses to AND gate 42. Since the signal processing circuit requires measurements with a positive and a negative series of measurement value pulses, the risk of false echoes is reduced, and the accuracy of the measurement is increased.

While there has been shown and described what is considered to be preferred embodiments of the present invention, it will be obvious to those skilled in the art that various changes and modifications may be made therein without departing from the invention as defined in the appended claims.

We claim:
1. A cloud altitude measuring means for detecting the existence of and the distance to a cloud, said means comprising:
    (a) a light emitter to emit a series of light pulses and to trigger reference pulses for producing delayed pulses at consecutive time intervals in steps of increasing altitude within the measuring range of the said measuring means;
    (b) a light receiving means to receive said light pulses reflected from a cloud;
    (c) a plurality of integrators for receiving the output signal of the said light receiving means, said integrators being activated to receive said output signals from the receiver at separate time intervals relative to each emitted light pulse, said signals comprising reflected light pulse plus noise or only noise;

(d) a signal summation device to receive the output signal from each of the said integrators and determine for each series of light pulses the difference between the signals received in the said integrators; and (e) a signal processing circuit to receive the output signal of the said signal summation device, said signal processing circuit comprising a memory for storing a first series of measurement value pulses from the signal summation device and a comparison device for comparing the said first series of measurement value pulses stored in said memory with a second time delayed series of measurement value pulses.

2. The cloud altitude measuring means of claim 1 wherein the said plurality of integrators is comprised of two integrators.

3. The cloud altitude measuring means of claim 1, wherein the signal processing circuit comprises an analogue-digital convertor for converting the measurement value pulses received from the summation device into digital signals, said signals being transmitted to a memory, said memory output being connected to a comparison device.

4. The cloud altitude measuring means of claim 1, wherein a level-sensing device is connected to the output of the comparison device, said level sensing device transmitting an output signal when the input signal from the comparison device exceeds a specified value.

5. The cloud altitude measuring means of claim 1, wherein the signal processing circuit comprises two level-sensing devices with the inputs of said devices connected to the output of the summation device, one of said level-sensing devices receives positive signals from the summation device and transmits an output signal to the said memory when the amplitude of the input signal exceeds a certain value, the second of said level-sensing devices receives negative input signals from the summation device and transmits an output signal when the amplitude of the input signal falls below a certain value, and said signal processing circuit having an AND gate to receive the output signal from the memory and the output signal from the second of such level-sensing devices.

* * * * *